US008542889B2

(12) United States Patent
Sarnoff

(10) Patent No.: US 8,542,889 B2
(45) Date of Patent: Sep. 24, 2013

(54) SYSTEMS, METHODS, AND COMPUTER-READABLE MEDIA FOR CAPTURING A SIGNATURE FOR USE IN A DOCUMENT

(75) Inventor: Matthew Sarnoff, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 389 days.

(21) Appl. No.: 12/907,835

(22) Filed: Oct. 19, 2010

(65) Prior Publication Data

US 2012/0093409 A1 Apr. 19, 2012

(51) Int. Cl.
*G06K 9/00* (2006.01)
*G06K 9/34* (2006.01)
*G06K 9/18* (2006.01)

(52) U.S. Cl.
USPC ............ 382/123; 382/119; 382/173; 382/186

(58) Field of Classification Search
USPC .................................................. 382/119, 123
See application file for complete search history.

(56) References Cited

U.S. PATENT DOCUMENTS 4,020,463 A * 4/1977 Himmel ........................ 382/242
4,028,674 A * 6/1977 Chuang ......................... 382/123
5,857,029 A * 1/1999 Patel ............................. 382/119
6,064,751 A * 5/2000 Smithies et al. .............. 382/115
6,246,793 B1 * 6/2001 Rindtorff et al. ............. 382/174
6,470,094 B1 * 10/2002 Lienhart et al. ............... 382/176
6,473,522 B1 * 10/2002 Lienhart et al. ............... 382/168
7,111,787 B2 9/2006 Ehrhart
7,293,712 B2 11/2007 Wang
7,787,711 B2 * 8/2010 Agam et al. .................. 382/305
7,916,907 B2 * 3/2011 Beatson et al. ............... 382/119
2007/0291017 A1 12/2007 Syeda-Mahmood et al.
2010/0086131 A1 * 4/2010 Yeh et al. ...................... 380/243
2010/0182631 A1 7/2010 King et al.
2010/0289835 A1 * 11/2010 Holub ........................... 345/690
2011/0179289 A1 * 7/2011 Guenther ...................... 713/189

* cited by examiner

*Primary Examiner* — Utpal Shah
(74) *Attorney, Agent, or Firm* — Fletcher Yoder PC

(57) ABSTRACT

Systems, methods, and computer-readable media are provided for capturing a signature, and placing a representation of the captured signature in an appropriate field of a document. A camera or other appropriate sensor can capture an image of a signature provided by a user on a piece of paper. The signature can be digitized to create a representation that a device may use in a displayed document. To determine where to place the representation, a horizontal line of a document can be identified by selectively rendering portions of the document adjacent to an input position, and identifying one or more boundaries for a detected horizontal line. The representation can be scaled to fit in a detected field of the document.

17 Claims, 16 Drawing Sheets

SYSTEMS, METHODS, AND COMPUTER-READABLE MEDIA FOR CAPTURING A SIGNATURE FOR USE IN A DOCUMENT

BACKGROUND

Some electronic devices can be used to enter data in documents displayed by the device. For example, a device can display a document provided by an electronic document file, such as a portable document format ("PDF") file document or a word processing file document, that may include one or more text fields in which text can be entered. In particular, a user can select a particular field, and a provide text input information using an input interface of the device. Text corresponding to the text input information can be displayed in a text field of the document, and saved or printed as part of the document file. Some documents, however, must be signed by a user. For example, government-issued or legal documents can require a signature before being filed. When such documents are created or filled-in on an electronic device, a user may not have a simple mechanism for including a signature in the document. Instead, a user may be forced to print a physical hardcopy of the document, sign the printed document, and transmit the signed physical document to a receiving party (e.g., by mail, facsimile, or by scanning the signed physical document and e-mailing the scanned document). This approach can be time consuming and burdensome for a user.

SUMMARY

Systems, methods, and computer-readable media for capturing a signature and placing a representation of the captured signature in a document are provided.

An electronic device can display a document having several fields, including a field in which a user can provide a signature. Because a signature cannot be provided using key stroke information of an electronic device keyboard, a user can write a signature on a piece of paper or other object of the user's environment, and place the signature in front of a camera for capturing an image of the signature. For example, a user can capture an image of the signature using a camera integrated with or coupled to the electronic device. As another example, a user can capture an image of the signature using a camera that may otherwise communicate the captured image to the electronic device.

The electronic device can process the captured image to create a digital representation of the captured signature that may then be used in the document. The electronic device can identify light regions in a captured image, and define a boundary for the signature based on the light regions. The electronic device can then apply a raster-to-vector process to portions of the image within the boundary to create a vector representation of the signature. The raster-to-vector process can result in a representation of the signature that may include the outline of the user's signature strokes (e.g., pen or pencil strokes), any changes in line thickness of the strokes, velocity of the strokes, and other attributes of the signature. The representation of the signature can be encrypted and stored such that only an authorized user, using an authorized application, can access the representation of the captured signature.

The electronic device can identify any suitable field of the document in which to place a signature. In some cases, the electronic device can automatically identify one or more horizontal lines depicting bottom boundaries for fields in which a signature can be placed. The electronic device can initially identify a line by rendering an initial portion of a displayed document that may be adjacent to a position of a pointer or other user interface input. If the rendered portion includes what may be determined to be a horizontal line, the electronic device can expand the render an additional portion along a horizontal axis of that line (e.g., an x-axis) until left and right boundaries for the line may be identified.

Once a line on which a representation of a captured signature may be placed has been identified, the electronic device can display the representation of the captured signature on the identified line. The electronic device can re-size the representation such that the representation may fit on the line. For example, the electronic device can match the length of the representation with the length of the line, and may adjust the height of the representation such that the aspect ratio of the representation can be maintained. If the height of the adjusted representation is larger than a threshold, the height of the representation may be restricted to the threshold, and the length of the representation can be adjusted to maintain the aspect ratio of the signature.

BRIEF DESCRIPTION OF THE DRAWINGS

The above and other aspects of the invention, its nature, and various features will be more apparent upon consideration of the following detailed description, taken in conjunction with the accompanying drawings in which like reference characters may refer to like parts, and in which.

DETAILED DESCRIPTION

Systems, methods, and computer-readable media for capturing a signature and placing a representation of the captured signature in a document are provided and described with reference to FIGS. 1-20.

Some documents displayed by an electronic device can include fields in which a user's signature is to be placed. To improve a user's use of such a document, the electronic device can enable a user to provide a digitized representation of a signature in an appropriate document field. For example, the user can sign an object (e.g., a piece of paper), and place the signed object in front of a camera to capture an image of the signature. The image of the signature can be digitized to create a scalable representation that may be placed in the document.

To place the representation of the captured signature in an appropriate field of a document, a user can provide an input identifying a particular position on the document. The electronic device can identify a line passing through or adjacent to the identified position, and may place the representation in the document with respect to the identified line. The electronic device can re-size the representation, while maintaining the aspect ratio of the representation, such that the representation may fill an appropriate amount of a field that may correspond to the identified line.

Figure 1:
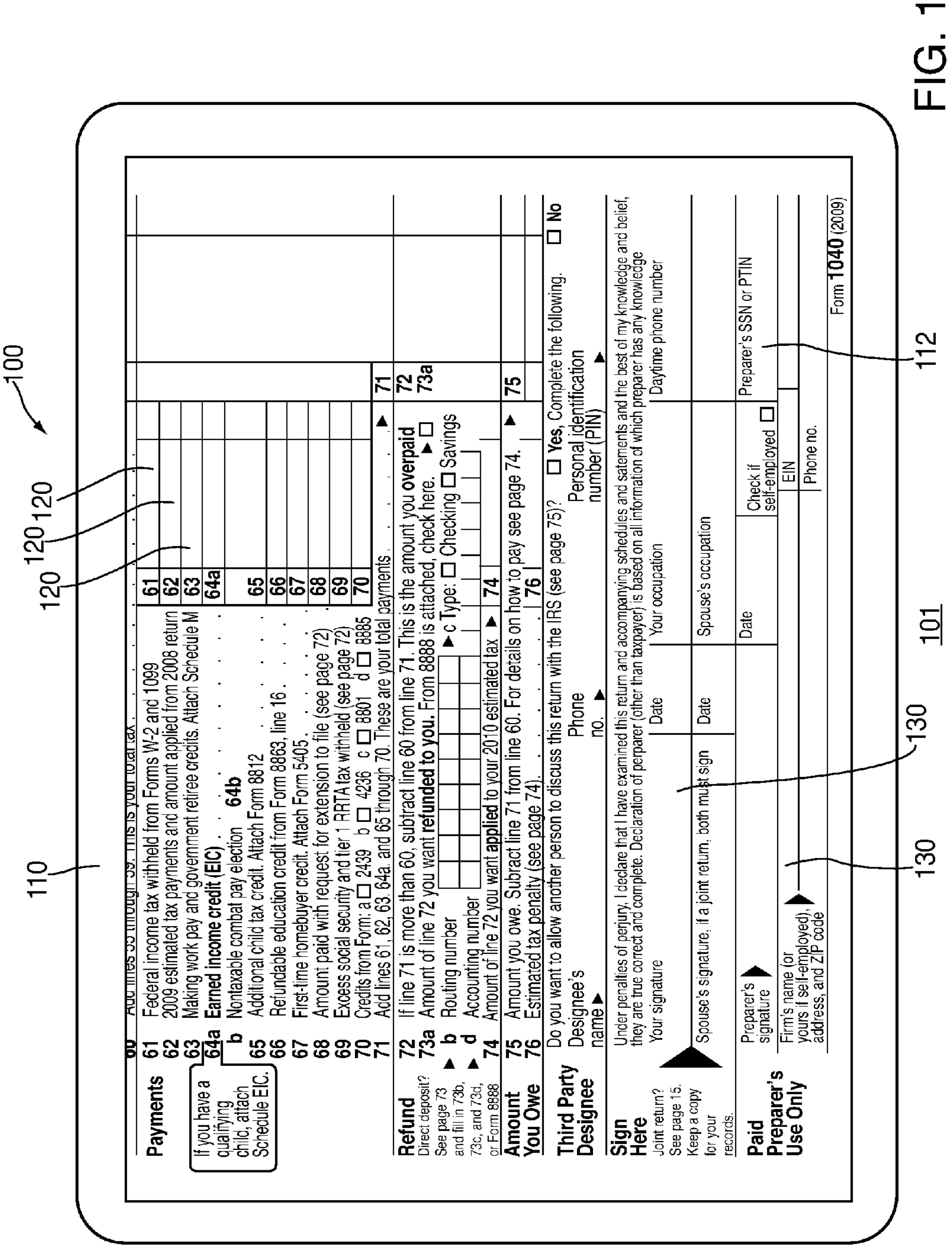
FIG. 1 is an illustrative electronic device display of a document having a signature field in accordance with some embodiments of the invention.

An electronic device can display a document having a region or a field in which data can be entered. FIG. 1 is an illustrative view of an electronic device display of a document having a signature field in accordance with some embodiments of the invention. Display 100, provided by electronic device 101, can include document 110 having several fields 112. For example, document 110 can include a document provided by an electronic document file, such as a portable document format ("PDF") file document or a word processing file document, that may include one or more fields 112 in which data can be entered. A user can direct device 101 to display document 110, and can provide device 101 with data to be entered into fields 112. Among the fields, document 110 can include one or more text entry fields 120 in which a user can provide text input information using an input interface (e.g., a keyboard) of device 101. Each text entry field 120 can be selected individually to specify a field in which to provide particular text.

In addition to text entry fields 120, document 110 can include one or more signature fields 130 in which a user can provide signature information. Because many electronic devices may not include input interfaces by which a user can directly provide a signature (e.g., a touch surface that can detect and capture strokes of a user's signature), another approach may be required to provide a signature in a signature field 130.

Figure 2:
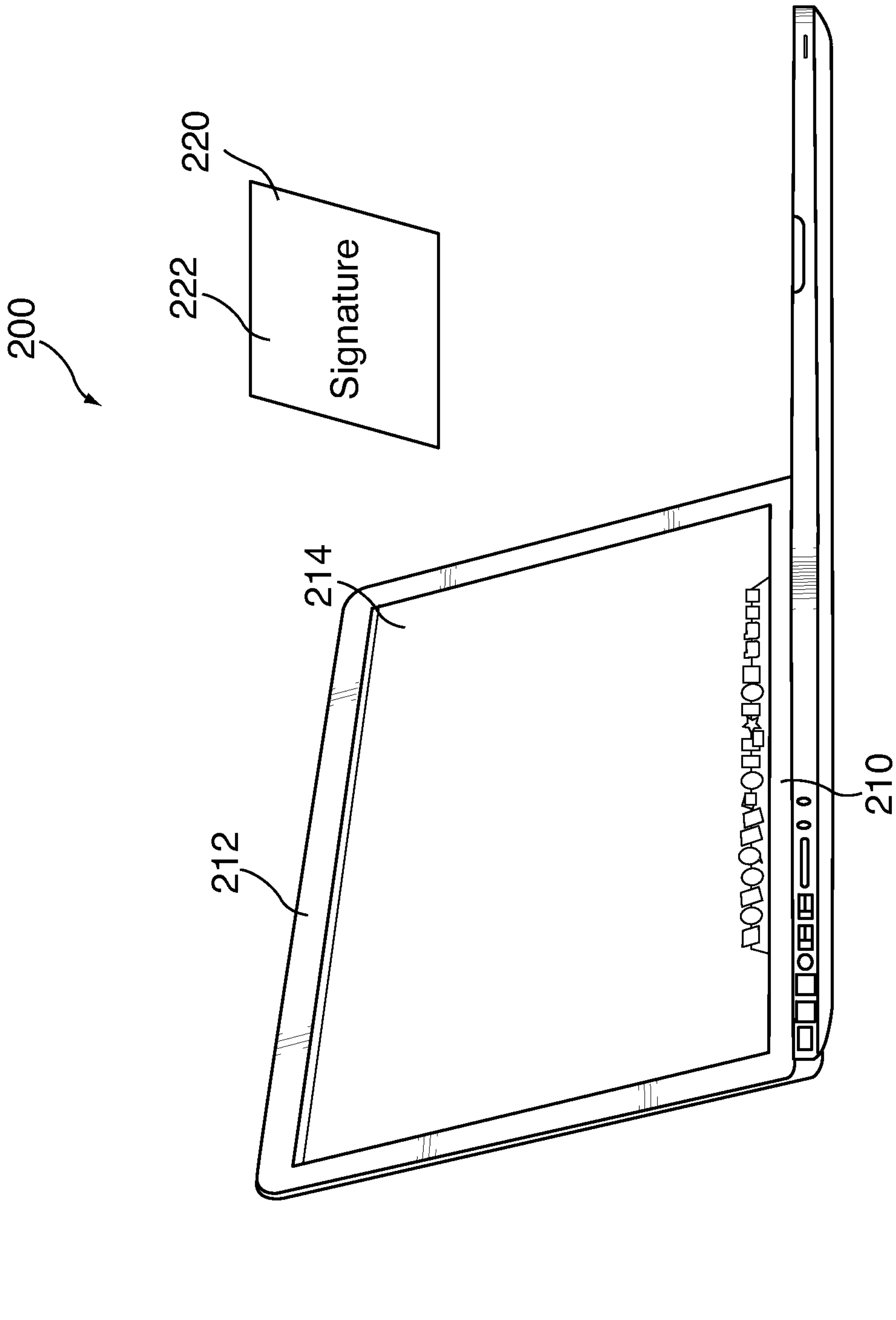
FIG. 2 is a representation of a signed object placed opposite a camera coupled to an electronic device in accordance with some embodiments of the invention.

In one approach, an electronic device can generate a digital representation of a user's signature from a captured image of an actual signature of a user. For example, the user can provide a signature on an object (e.g., a piece of paper or other surface or substrate) using a writing instrument. For example, a user can sign his name using a dark colored pen on a piece of white or light colored paper. The user can then place the signed paper opposite a camera that may communicate captured image information with the electronic device. For example, the user can position the signed paper in front of a webcam coupled to or integrated with the electronic device. As another example, the user can position a camera to capture an image of the signature (e.g., if the camera is movable relative to the device). FIG. 2 is a representation of a signed object placed opposite a camera coupled to an electronic device in accordance with some embodiments of the invention. Representation 200 can include electronic device 210 that may have integrated camera 212. Camera 212 can be positioned on a same plane as display 214 of device 210 such that camera 212 can be typically oriented towards a user viewing content on display 214. Object 220, which can include signature 222 provided thereon, can be disposed such that signature 222 may be within a field of view of camera 212.

Figure 3:
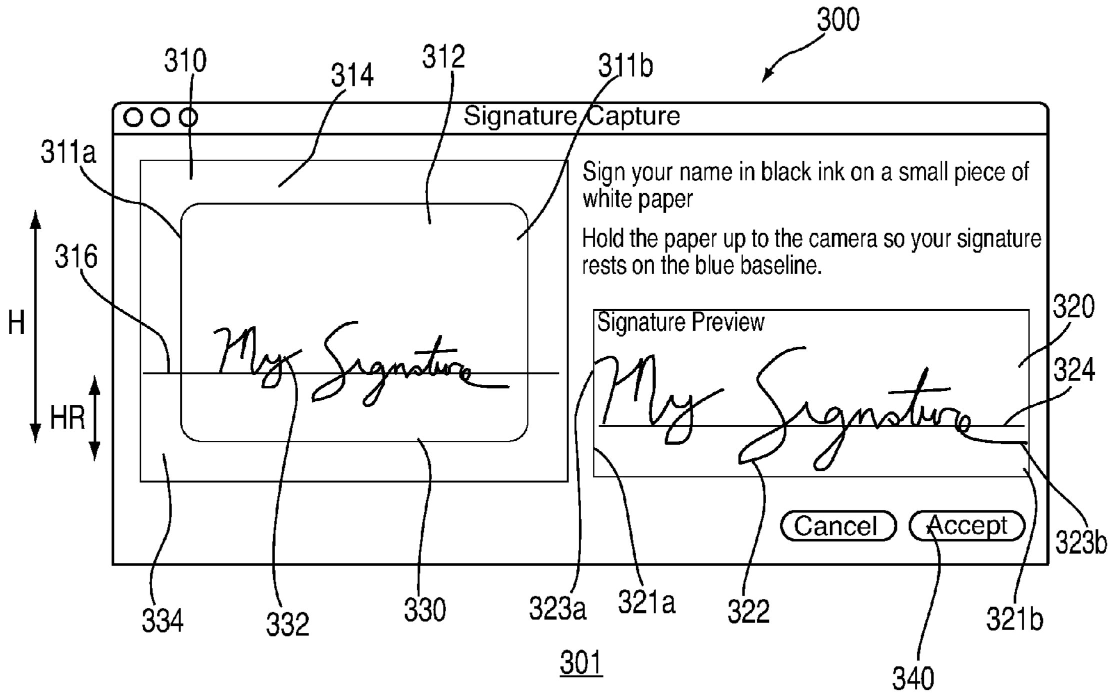
FIG. 3 is an illustrative electronic device display for capturing an image of a signature in accordance with some embodiments of the invention.

An electronic device can display any suitable interface to assist a user in positioning a signature relative to a camera. For example, FIG. 3 is an illustrative display provided by an electronic device for capturing an image of a signature in accordance with some embodiments of the invention. Electronic device 301 can provide display 300 in response to any suitable instruction from a user. In some cases, electronic device 301 can provide display 300 in response to receiving an instruction from a user to capture a new signature. Display 300 can include window 310 that may correspond to an image captured by a camera, and preview region 320 that may provide a preview of a digital representation of a signature captured in the image of window 310.

Window 310 can include central region 312 that may be processed to identify a signature, and border region 314 that may surround central region 312. Window 310 can also include reference line 316 that may be overlaid on window 310 to provide a reference with which a signature provided on an object and captured by a camera can be aligned. Reference line 316 can be positioned at any suitable height in window 310 including, for example, a height that may ensure that portions of letters of a signature extending below reference line 316 may be displayed in central region 312 in addition to portions of letters extending above reference line 316. For example, as shown in FIG. 3, reference line 316 can be located at a height HR, which may be ⅓ of a total height H of window 310 from the bottom of window 310.

In some cases, the electronic device can instead or in addition provide a vertical base line with which a signature can be aligned (e.g., vertical base line 333). The electronic device can then establish vertical boundaries (e.g., left and right boundaries) that may serve as limits for a region in which to apply a raster-to-vector process, as described in more detail below.

Images captured by the camera can be displayed in window 310 for review by a user. In the example of display 300, the image of window 310 can include object 330 having signature 332. The user can hold object 330 (e.g., as shown by user finger 334 in window 310) opposite the camera, and may position object 330 with respect to the camera such that signature 332 may be aligned with reference line 316 of window 310. In some cases, the user may position object 330 with respect to the camera such that signature 332 may substantially fill central region 312 of window 310 (e.g., the user may move object 330 closer to or further away from the camera to change the size of signature 332 captured by the camera within window 310).

Electronic device 301 can process at least the portions of a captured image that are within central region 312 of window 310 to facilitate the extraction of a digitized representation of signature 332. Electronic device 301 may first convert a color image to a grayscale image, and may then smooth the converted image using a Gaussian blur to eliminate threshold noise. In some cases, an adaptive thresholding function can be applied that may convert the image to black and white, and that may compensate for different lighting conditions and brightness gradients. Alternatively, other processes can be used to process a captured image to distinguish portions corresponding to a signature from other portions of the captured image (e.g., user's finger 334 or certain portions of object 330, such as a background portion of object 330). Although portions of the following discussion may describe distinguishing a signature from a background in a black and white image, it will be understood that any suitable process can be used including, for example, any process that allows for the distinction between content and a background.

Figure 4:
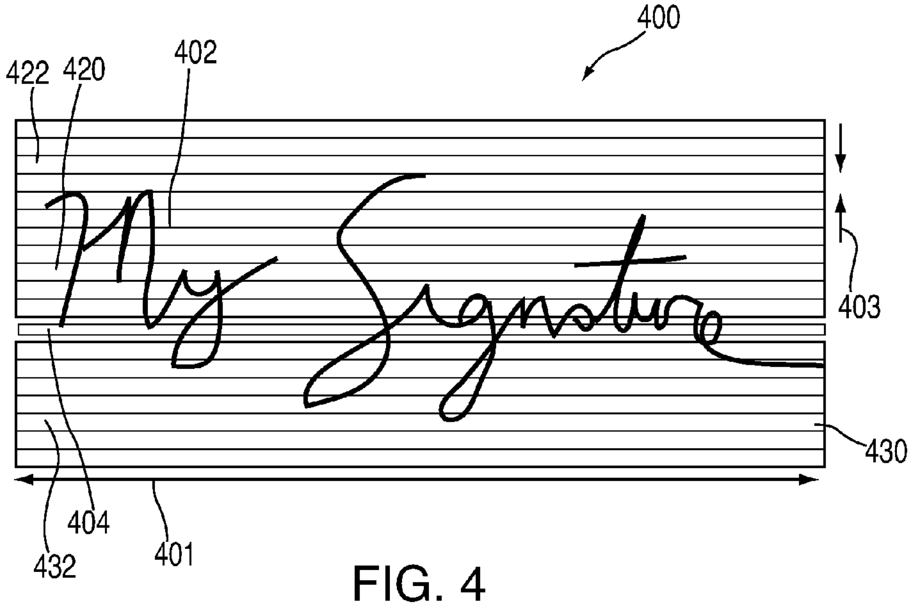
FIG. 4 is a schematic representation of an illustrative approach that may be used to identify a boundary box for a signature captured in an image in accordance with some embodiments of the invention.

Once a captured image has been processed to distinguish signature portions of the image from other portions of the image, an electronic device can identify a boundary box for the signature. FIG. 4 is a schematic representation of an illustrative approach that may be used to identify a boundary box for a signature in accordance with some embodiments of the invention. Captured image 400 can include signature 402 that may be virtually positioned on reference line 404 (e.g., the reference line may be provided on display 400 to serve as a reference for a user to position signature 404 relative to a camera). An electronic device can define successive rows of pixels 420 that may be stacked above or include reference line 404, and successive rows of pixels 430 that may be stacked below or include reference line 404. Each one of rows 420 and 430 may extend the entire length 401 of image 400. Each one of rows 420 and 430 can have any suitable height 403 including, for example, a single pixel. Starting with a first row 420 that may be determined to be nearest reference line 404, an electronic device can determine whether that first row 420 includes a particular amount of consecutive white portions (e.g., a particular number of consecutive white pixels). For example, the electronic device can determine whether the row includes a white portion that extends continuously for 75% of length 401 of image 400. As another example, the electronic device can determine whether row 420 includes thirty consecutive white pixels. If the electronic device determines that the row 420 includes a continuous white portion that extends at least a threshold amount, the electronic device can determine that the selected row 420 is a top boundary for signature 402. In some cases, the electronic device can also determine whether additional rows above the selected row include the particular amount of consecutive white portions. For example, the electronic device can also determine whether thirty rows above the selected row also satisfy the consecutive white portion threshold.

Alternatively, if the electronic device determines that the longest continuous white portion of the selected row 420 does not exceed a threshold amount, the electronic device can select the next closest row 420 to reference line 404. The electronic device can then compare the white portions of the next selected row 420 with a threshold, and continue selecting the next closest row 420 until a top boundary is found. If a selected row satisfies the criteria, but does not have an adequate number of additional rows further from reference line 404 that also satisfy the continuous white portion criteria, the electronic device can select the furthest of the additional rows that satisfies the continuous white portion criteria to be the top boundary. If no rows satisfy the continuous white portion criteria, the top row of the central region can serve as the top boundary. The electronic device can perform a similar progression to identify a row 430 providing a bottom boundary for signature 402.

In the example of image 400, the electronic device can determine that particular row 422 is the closest line above reference line 404 that includes at least a threshold amount of continuous white portions (e.g., at least thirty continuous white pixels). Also, the electronic device can determine that particular row 432 is the closest line below line 404 that includes at least a threshold amount of continuous white portions. Rows 422 and 432 can then serve as the top and bottom boundaries, respectively, for signature 402 (e.g., the ascent and descent boundaries of signature 402, respectively).

In some cases, once the top and bottom boundaries have been established for signature 402, or before one or both of the top and bottom boundaries have been established, the electronic device can similarly establish left and right boundaries for signature 402. For example, beginning from each of the left and right edges of image 400, the electronic device can identify a first column that includes a non-white portion corresponding to signature 402 (e.g., a first column of pixels with a threshold of non-white pixels). The electronic device can then convert the raster representation of the signature enclosed by the established boundary box (e.g., a boundary box defined by the established top, bottom, left, and right boundaries) to a vector representation.

In some cases, however, it may not be necessary to identify left and right or top and bottom boundaries for signature 402. Instead, the electronic device can directly apply a raster-to-vector process (e.g., a vectorization process) to convert an image representation of signature 402 to a vector representation of the signature. The raster-to-vector transformation can ignore white portions of image 400 that are within the boundary box defined by top boundary row 422 and bottom boundary row 432, and can replace black portions of the image with a vector representation. By limiting the transformation to the regions of image 400 that are within the boundary box, the electronic device can more efficiently process the image. The resulting vector representation can include, for example, a Bezier path that may follow the outline of user strokes used to create signature 402. In particular, the vector representation can reproduce changes in line thickness, velocity of the writing instrument, or other unique features of signature 402.

Figure 5:
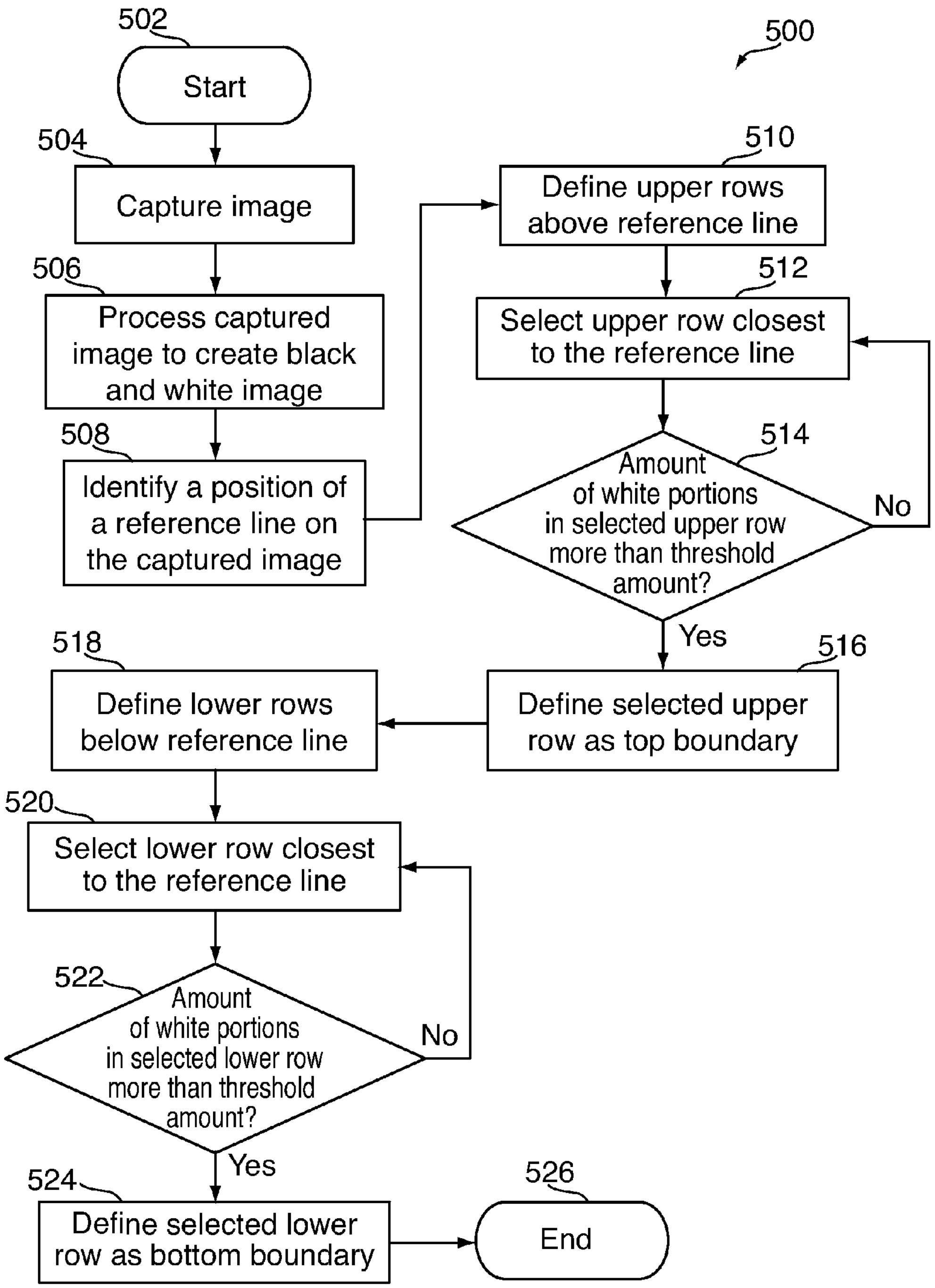
FIG. 5 is a flowchart of an illustrative process for creating a vector representation of a signature captured in an image in accordance with some embodiments of the invention.

FIG. 5 is a flowchart of an illustrative process 500 for creating a vector representation of a signature captured in an image in accordance with some embodiments of the invention. Process 500 can begin at step 502. At step 504, an image can be captured. For example, a camera coupled to an electronic device can be used to capture an image of a signature provided on a piece of paper. At step 506, the captured image can be processed to create a black and white image. For example, an electronic device can apply one or more transformations to the captured image to distinguish portions of a signature from portions a background. At step 508, a position of a reference line on a captured image can be identified. For example, the electronic device can identify a particular line or row of pixels that may correspond to a reference line that can be used to align a signature at a particular portion of a captured image. In particular, the electronic device can display a reference line to assist a user in positioning the signature to generate an appropriate captured image. At step 510, several upper rows can be defined above the reference line. For example, the electronic device can define a succession of rows of pixels, each of which may have a particular height. The upper rows may abut or overlap one another as they extend above the reference line.

At step 512, the defined upper row closest to the reference line can be selected. At step 514, the amount of continuous and/or total white portions in the selected upper row can be compared to one or more threshold amounts. For example, the electronic device can determine whether a selected upper row includes a continuous set of white pixels that exceeds 75% of the row length, or that exceeds 30 total pixels, or whether at least 95% of the pixels of the row are white. If the amount of continuous white portions is less than the threshold amount, process 500 can return to step 512 and select the next closest upper row to the reference line. If the amount of continuous white portions is more than the threshold amount, process 500 can move to step 516. At step 516, the selected upper row can be defined as a top boundary for the signature.

At step 518, several lower rows can be defined below the reference line. For example, the electronic device can define a succession of rows of pixels, each of which may have a particular height. The rows may abut or overlap as they extend below the reference line. At step 520, the defined lower row closest to the reference line can be selected. At step 522, the amount of white portions in the selected lower row can be compared to a threshold amount. For example, the electronic device can determine whether a selected lower row includes a set of continuous pixels that exceeds 75% of the row length, or that exceeds 30 pixels. If the amount of continuous white portions is less than the threshold amount, process 500 can return to step 520 and select the next closest lower row to the reference line. If the amount of continuous white portions is more than the threshold amount, process 500 can move to step 524. At step 524, the selected row can be defined as a bottom boundary for the signature. Process 500 can then end at step 526.

Returning to display 300 of FIG. 3, display 300 can include, in preview region 320, a representation 322 of signature 332 that may be generated by electronic device 301. Preview region 320 can include a reference line 324 that may correspond to reference line 316 of window 310. As the user moves signed object 330 relative to the camera, electronic device 301 can generate representation 322 for signature 332 of a captured image. Electronic device 301 can display the generated representation 322 in preview region 320 such that the position of signature 332 relative to reference line 316 in window 310 substantially corresponds to the position of representation 322 relative to reference line 324. For example, representation 322 can vary in real-time as an image captured and displayed in window 310 varies.

In some cases, representation 322 can be sized to fit the entirety of preview region 320. In particular, a raster-to-vector process can automatically identify the ends of representation 322, and display representation as large as possible in preview region 320. For example, first end 323*a* of representation 322 can be aligned with first end 321*a* of preview region 320, and second end 323*b* of representation 322 can be aligned with second end 321*b* of preview region 320. This approach may allow a user to preview left and right boundaries of representation 322 without requiring a user to position paper 330 such that left and right ends of signature 332 match the left and right boundaries of central region 312 (e.g., left boundary 311*a* and right boundary 311*b* of central region 312).

To improve a user's experience, electronic device 301 can dynamically adjust representation 322 displayed in preview region 320 based on the position of signed object 330 and signature 332 relative to a camera, and thus detected in window 310. In particular, electronic device 301 can dynamically process a captured image to create a vector representation of a signature at different moments in time. The representation can then be provided in preview region 320 for the user's approval. Once the user finds representation 322 acceptable, the user can select option 340 to store representation 322 for future use.

A representation of a signature can be stored using different approaches. In some cases, the representation may not be stored on disk, but may be lost when the application used to create the signature (e.g., a PDF viewer or editor) quits. This can provide security to a user of the electronic device, as unauthorized users may not be able to retrieve the user's stored signature once the application has quit. Alternatively, a generated representation can be encrypted, as it can constitute sensitive information. The decryption key required for decrypting the representation can be stored by an operating system of the device, for example as part of a keychain. In some cases, a representation can be encoded such that only specific authorized applications can use a decryption key to decrypt a stored representation. For example, only the application used to create the representation of the signature, or an application used to populate documents requiring a signature can be enabled to decrypt an encrypted representation of a signature.

In some cases, representations of signatures can be associated with specific users or with specific accounts of an electronic device. In particular, in a device having several user accounts, a user can limit access to a representation of a signature to the user's account, for example to prevent a child from using his account to sign a permission slip using a representation of a parent's signature that is associated with the parent's account. Alternatively, a user can allow the signature to be used from other user accounts of the device.

Figure 6:
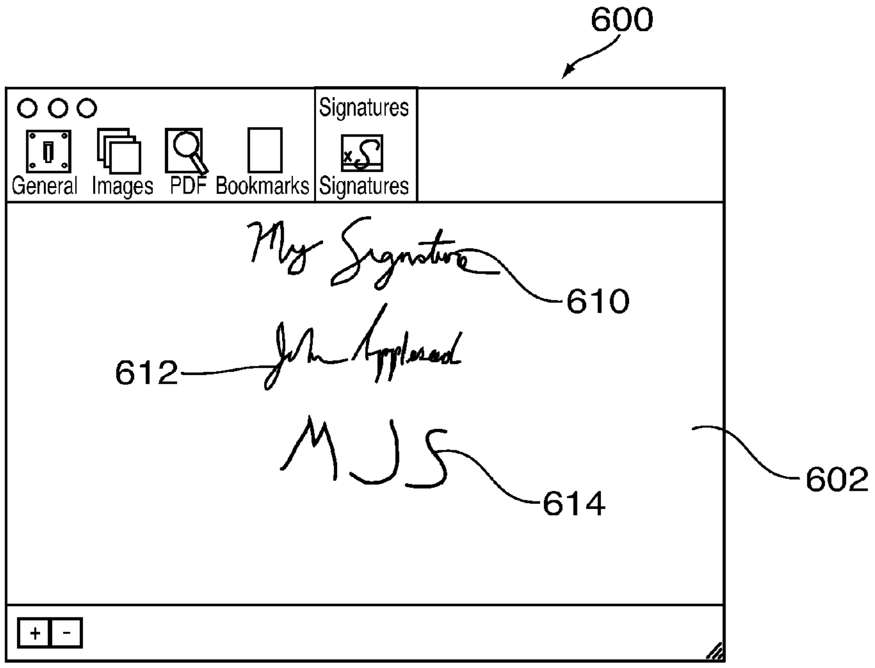
FIG. 6 is an illustrative electronic device display of available signature representations in accordance with some embodiments of the invention.

A user can store any suitable number of representations of signatures. For example, a user can store a signature with or without a middle name or middle initial, or a signature that includes the user's initials or one or more symbols. FIG. 6 is an illustrative electronic device display of available signatures in accordance with some embodiments of the invention. Display 600 of an electronic device 601 can include window 602 in which several representations of signatures can be displayed. For example, window 602 can include representations 610, 612, and 614 of signatures provided by a user. The representations can correspond to different manners in which a user may sign documents, or can correspond to signatures provided by different users. For example, representations 610 and 612 can correspond to signatures provided by two different users, while representation 614 can correspond to the initials of one of the users. The representations can be provided in any suitable order including, for example, in an order corresponding to when they were created (e.g., representation 614 is the newest representation, and representation 610 is the oldest representation). A user can set a particular representation of window 602 as a default signature, or can delete one or more representations from window 602.

Figure 7:
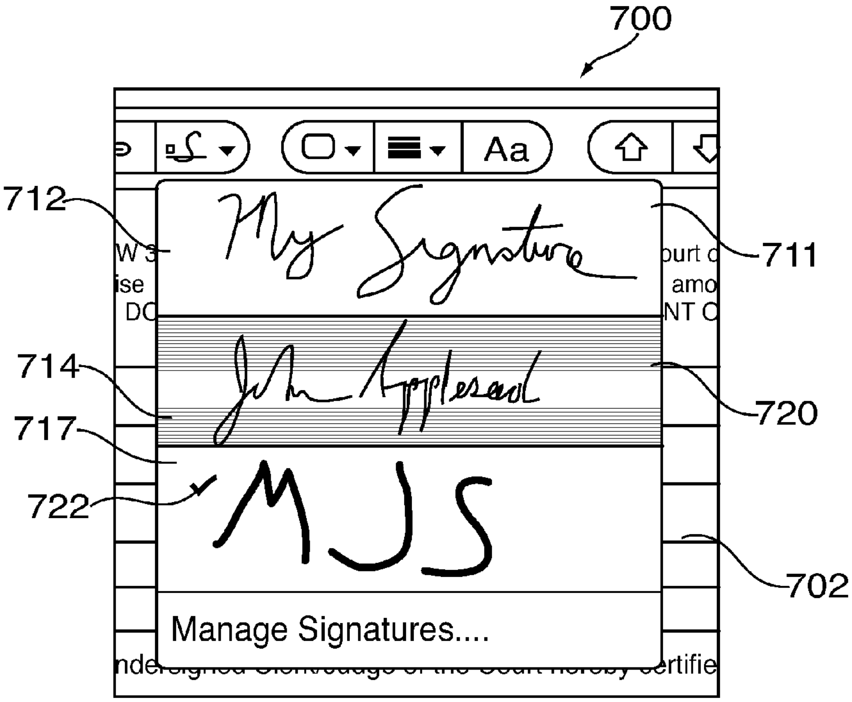
FIG. 7 is an illustrative electronic device display of a menu overlaid on a document for providing a signature in the document in accordance with some embodiments of the invention.

To place a representation of a signature in a displayed document, an application providing the document can include a menu in which a signature can be selected. FIG. 7 is an illustrative display of a menu overlaid on a document for providing a signature in the document in accordance with some embodiments of the invention. Display 700 can include document 702 over which menu 710 can be overlaid. Menu 710 can include listing 711 of representations 712, 714, and 716 that can, in some cases, correspond to the representations of display 600 of FIG. 6. A user can select a particular representation by moving selection region 720 over listing 711. A currently selected or a default representation can be identified by marker 722.

Figure 8:
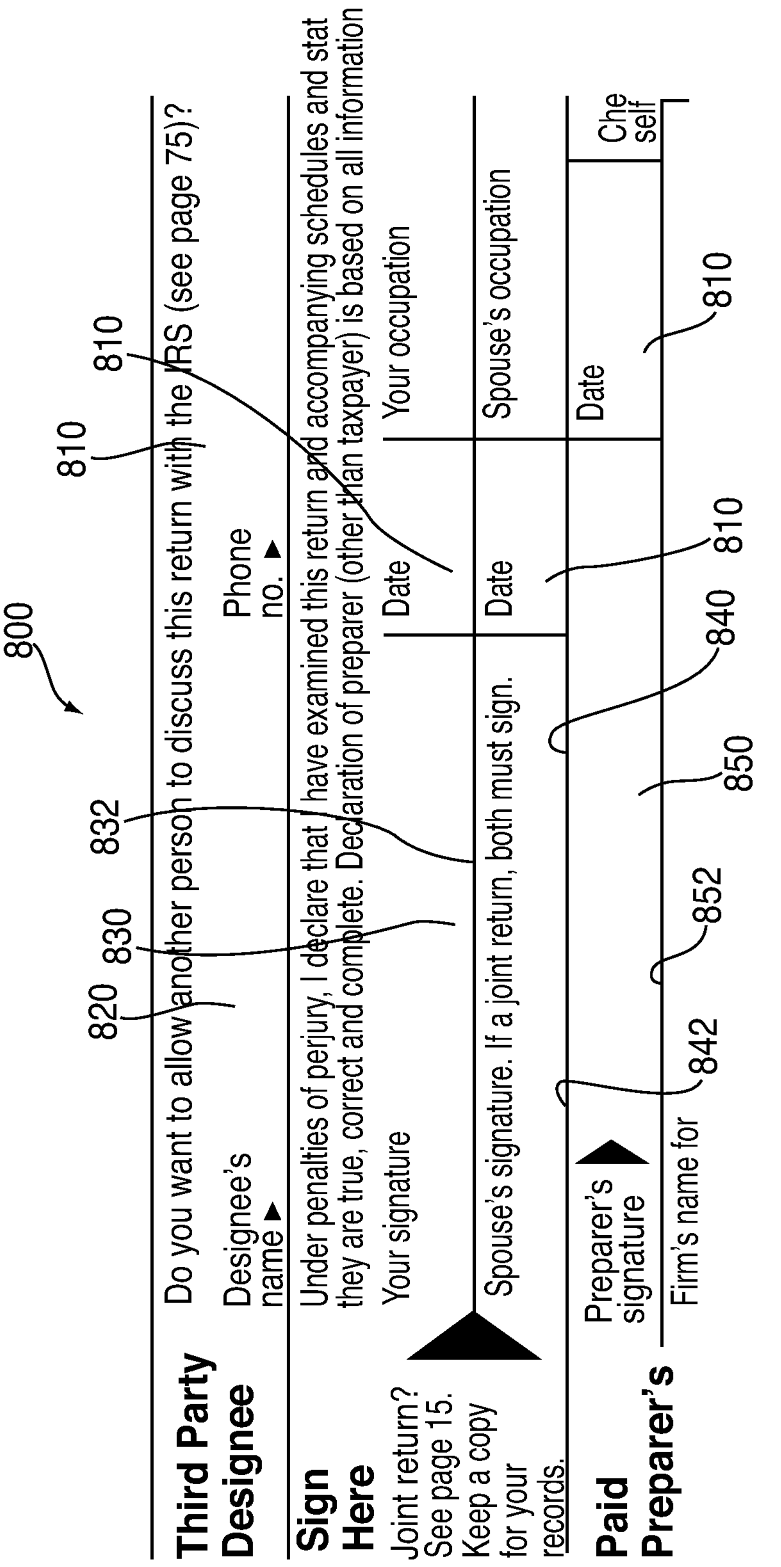
FIG. 8 is a view of a portion of an illustrative document having fields in which a representation of a signature can be placed in accordance with some embodiments of the invention.

Once a user has selected the particular representation to provide in the displayed document, the electronic device can identify a specific document field in which to display the representation. In one implementation, the electronic device can identify a field in a document based on the position of an input provided by a user. For example, the electronic device can identify the position of a cursor controlled by a user. As another example, the electronic device can identify the position of a touch input. FIG. 8 is a view of a portion of an illustrative document 800 that may have various fields in which a representation of a signature can be placed. Document 800 can include several fields 810, and in particular fields 820, 830, 840, and 850 in which a user may provide a signature.

Each signature field can be characterized by a horizontal line on which a signature representation can be placed. For example, signature field 820 can include base line 822, field 830 can include base line 832, field 840 can include base line 842, and field 850 can include base line 852. To place a signature in a field, a user can provide an input identifying one of the base lines. For simplicity, the following discussion describes providing an input via cursor 802, though it will be understood that other approaches for providing an input may be used (e.g., by selecting an appropriate field from a list of appropriate fields provided by the document application).

Figure 9:
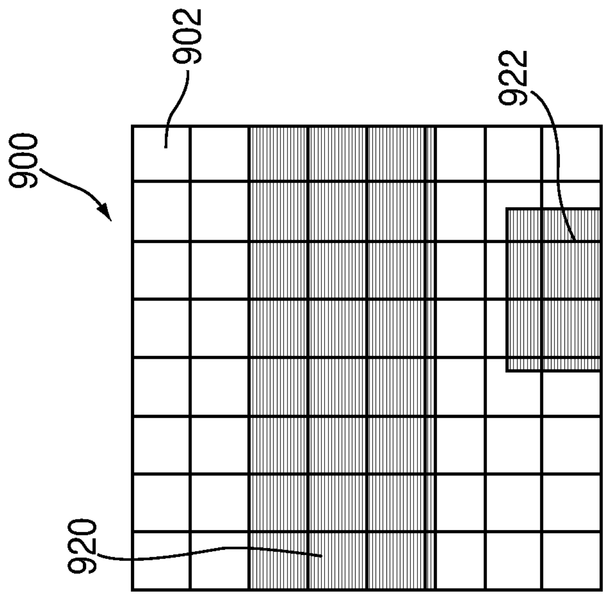
FIG. 9 is a view of an illustrative initially rendered portion of a document in accordance with some embodiments of the invention.

As a user moves cursor 802 to different positions on displayed document 800, the electronic device can identify a base line, if any, in a region adjacent to the cursor position. In some cases, the electronic device can initially render a portion of the document underneath the cursor to determine whether the cursor position corresponds to a base line of a field. For example, the electronic device can initially render an 8×8 pixel region or any other suitably sized region that may be centered about the cursor with a 4× scale or any other suitable scale. The rendered portion can be provided as an off-screen bitmap or any other suitable image file that may be analyzed to identify a base line. In some cases, the off-screen rendering can be provided in grayscale, with anti-aliasing and other smoothing functionality disabled to simplify processing. FIG. 9 is a view of an illustrative initially rendered portion of a document in accordance with some embodiments of the invention. Rendered portion 900 can correspond to a portion of document 800 adjacent to the position of cursor 802. Rendered portion 900 can include an 8×8 matrix of pixels 902. The pixels can be colored in a manner corresponding to the information of document 800. For example, rendered portion 900 can include colored pixels defining horizontal mark 920 that may extend through the entirety of rendered portion 900, and a vertical mark 922 that may be located underneath horizontal mark 920. Horizontal mark 920 can correspond to a portion of base line 822, while vertical mark 922 can correspond to a portion of a letter located underneath base line 822.

Figure 10B:
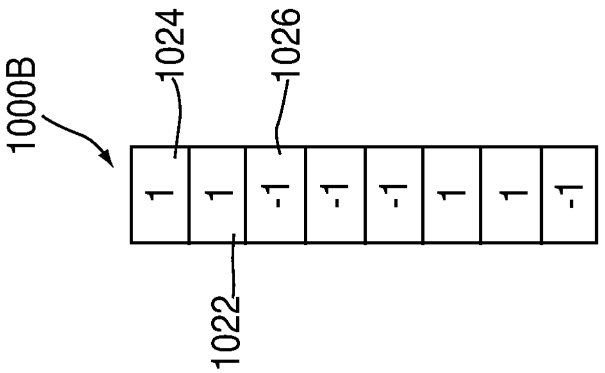
FIG. 10B is an illustrative converted data structure that may be used to identify a base line of a field in a document in accordance with some embodiments of the invention.
Figure 10A:
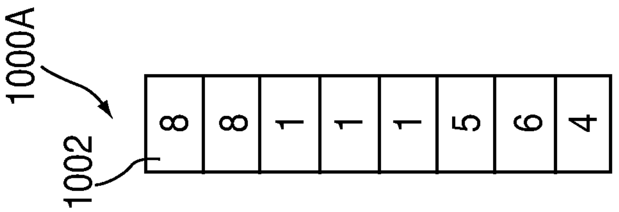
FIG. 10A is an illustrative data structure representing a sum of values of pixels in each row of the initially rendered portion of FIG. 9 in accordance with some embodiments of the invention.

The electronic device can process portion 900 using any suitable approach to initially detect a base line. In some cases, the electronic device can associate each pixel with a value based on the color of the pixel. For example, darker pixels can be associated with a smaller number, and lighter or white pixels can be associated with a larger number. The electronic device can then calculate, for each row of pixels, the sum of the values associated with each pixel in a given row. FIG. 10A is a data structure representing a sum of values of pixels in each row of initial rendered portion 900 in accordance with some embodiments of the invention. Data structure 1000A can include entries 1002, each of which may correspond to a row of rendered portion 900 (e.g., eight entries 1002). The value provided in each entry 1002 can correspond to the sum of values of individual pixels 902 in a corresponding row. For example, data structure 1000A can include entries 1002 having a value of 8 corresponding to light rows, while other entries 1002 can have a value of 1 corresponding to dark rows.

Once the electronic device has determined values associated with each row, the electronic device can convert the values to a binary system based on a threshold. FIG. 10B is a converted data structure used to identify a base line in accordance with some embodiments of the invention. Data structure 1000B can include entries 1022, each of which may correspond to entries 1002 of FIG. 10A. The values used for entries 1022 can be selected based on a binary threshold. For example, values of entries 1002 that are less than 5 can be replaced with a value of "−1," and values of entries 1002 that are larger than or equal to 5 can be replaced with a value of "1." In data structure 1000B, values of "−1" can correspond to dark lines.

The electronic device can scan the values of data structure 1000A and/or 1000B starting from an entry corresponding to a top-most row of an initially rendered portion. The electronic device can then identify the first entry in the data structure that has a value corresponding to a dark line (e.g., a value of "−1" of FIG. 10B). The identified first entry can be taken to constitute the top of a horizontal line on which a representation of a signature can be placed.

Figure 11:
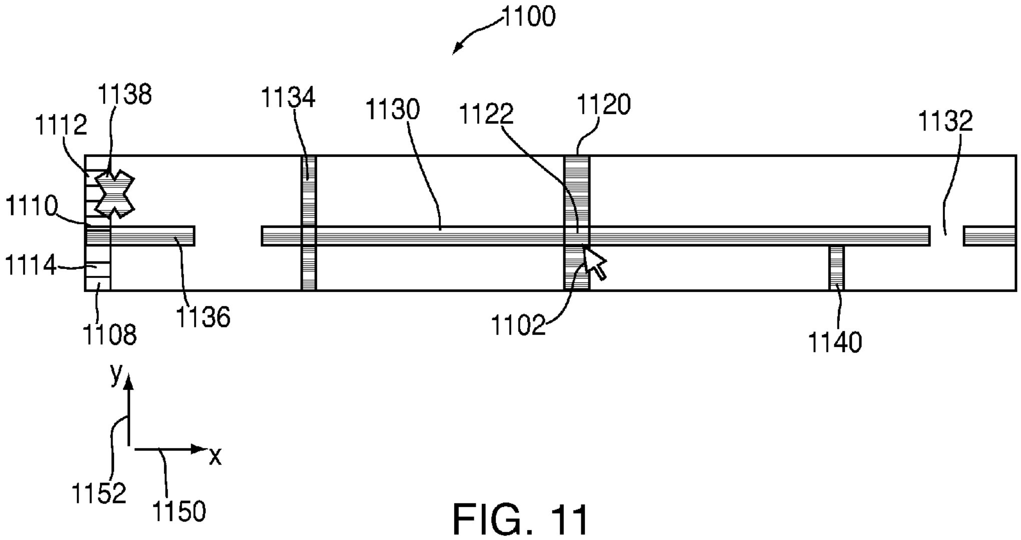
FIG. 11 is a view of an illustrative expanded rendered portion of a document in accordance with some embodiments of the invention.

Having identified a portion of a base line corresponding to a field using data structure 1000B (e.g., identifying a row of pixels corresponding to the top of mark 920 in rendered portion 900), the electronic device can identify the left and right boundaries of the base line. In some cases, the electronic device can render an expanded portion of the displayed document to identify the boundaries. FIG. 11 is a view of an illustrative expanded rendered portion in accordance with some embodiments of the invention. Expanded rendered portion 1100 can include a matrix of pixels having several rows 1108 extending across the entirety of the document (e.g., extending across an entire width of the document). The rows used in expanded rendered portion 1100 can be substantially centered about row 1110, which may correspond to the first entry 1022 of data structure 1000B (e.g., the top of a detected line). For example, expanded rendered portion 1100 can include central row 1110 that may correspond to an identified entry 1022, and any suitable number of rows 1112 and 1114 above and below central row 1110, respectively. By generating a representation that includes additional rows above and below central row 1110, the electronic device can detect boundaries for lines that are not horizontal (e.g., lines from documents that were scanned into the electronic device).

To identify left and right boundaries for an identified base line 1130 (e.g., based on the position of a cursor 1102), the electronic device can select at least central row 1110 and one or more rows 1112 immediately above central row 1110, although in some cases one or more rows 1114 immediately below central row 1110 can also be selected. It may be desirable to not select rows below central row 1110, as identified elements (e.g., vertical line 1140) may inadvertently be identified as boundaries for base line 1130 although the elements below central row 1110 actually have no impact on the boundaries of the base line. In some cases, the entirety of expanded rendered portion 1100 can be selected. The electronic device can then analyze the pixels in each of the selected rows starting from pixels that may correspond to a column 1120 that may be identified by the position 1122 of cursor 1102, and subsequently other columns that may extend away from position 1122 (e.g., columns along y-axis 1152 extending in both directions along x-axis 1150). For example, the electronic device can successively analyze columns of pixels extending through each of the selected rows. In some cases, the electronic device can process each pixel using a binary threshold to determine whether the pixel is dark or light (e.g., black or white).

Several different patterns or changes in pixel color between adjacent columns or rows can be identified as boundaries for base line 1130. For example, the electronic device can identify a change from a dark pixel to a light pixel along central row 1110 (i.e., a column corresponding to a left or right boundary of the base line) as a boundary for the base line. In particular, the electronic device can identify white portion 1132 of one or more pixels at a right boundary of base line 1130. As another example, the electronic device can identify a change from a light pixel to a dark pixel in a column of pixels above central row 1110. In particular, the electronic device can identify vertical bar 1134 of pixels at a left boundary of line 1130. By analyzing a column of pixels extending above central row 1110 (e.g., pixels in a particular column provided from pixels of consecutive rows 1112), the electronic device can identify markers in a field that are offset from line 1130. For example, the electronic device can identify marker 1138 that may correspond to a left boundary of another, unselected base line (e.g., base line 1136).

An electronic device can dynamically indicate an identified base line to a user. For example, as a user moves a cursor over a detected line, the entirety of the line may be highlighted. In particular, returning to FIG. 8, as a user moves cursor 802 over one of base lines 822, 832, 842, and 852, the electronic device can display a highlight region depicting the base line between left and right boundaries that may have been identified by the device.

Figure 12:
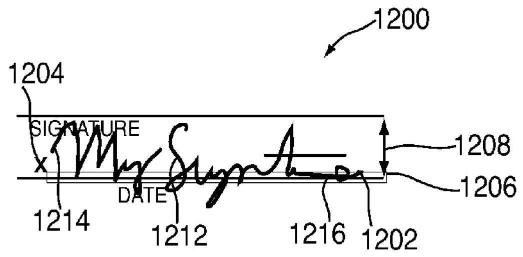
FIG. 12 is a view of a portion of an illustrative document in which a captured signature may be placed in accordance with some embodiments of the invention.

Once the boundaries of an identified base line have been identified, a representation of a signature can be positioned with respect to the line. In some cases, the electronic device can align a left-most portion of a representation with an identified left boundary of the line. Alternatively, a representation can be centered on the line, aligned with a right boundary of the line, or offset from one of the line boundaries. The representation can be positioned on the line such that the position of the representation relative to the line may substantially correspond to the position of the representation relative to a reference line (e.g., as shown in FIG. 3). FIG. 12 is a view of an illustrative document in which a signature may be placed in accordance with some embodiments of the invention. Document 1200 can include a field having base line 1202, which may be identified using any suitable approach. The electronic device can identify left boundary 1204 (e.g., an "x" near line 1202) and a right boundary 1206 (e.g., a white space extending beyond an edge of line 1202) for base line 1202. Representation 1212 of a signature can be placed in display 1200 such that an end or portion of representation 1212 corresponding to a reference line can be aligned with or slightly offset from identified boundaries or features of base line 1202. For example, left end 1214 of representation 1212 may be aligned with or slightly offset from left boundary 1204.

The displayed representation can be re-sized based on the size of an identified base line on which the representation is provided. In some cases, the size of the representation can be selected based on the length of an identified line (e.g., based on a distance between boundaries of the line). For example, the electronic device can scale a representation such that the length of the representation matches the length of the identified line. The scaled representation can maintain its aspect ratio to avoid undesired deformation of the representation. In some cases, the electronic device can limit a length of a representation based on a threshold associated with a height of the representation. For example, the electronic device can scale a representation until the height of the scaled representation reaches a threshold (e.g., 0.5 inches). The resulting representation may then have a length that is less than the length of the identified base line on which the representation is placed. As shown on document 1200, the length of representation 1212 between edges 1214 and 1216 is less than the length of line 1202 between boundaries 1204 and 1206. It will be understood that other characteristic dimensions of a representation can also or instead provide thresholds for sizing the representation. In some cases, a user can re-size or displace a representation after it has been placed on the displayed document. For example, a user can reposition a representation to fit entirely within a field.

Once a representation of a signature has been position in a field of a document, a user can publish the representation to incorporate the signature in the document. To prevent unauthorized users from extracting the representation for use in other documents, the electronic device can convert the signature representation to an image (e.g., using a vector-to-raster process). The resulting document can then be published without risking a person other than the signatory extracting the representation for unauthorized use.

Figure 13:
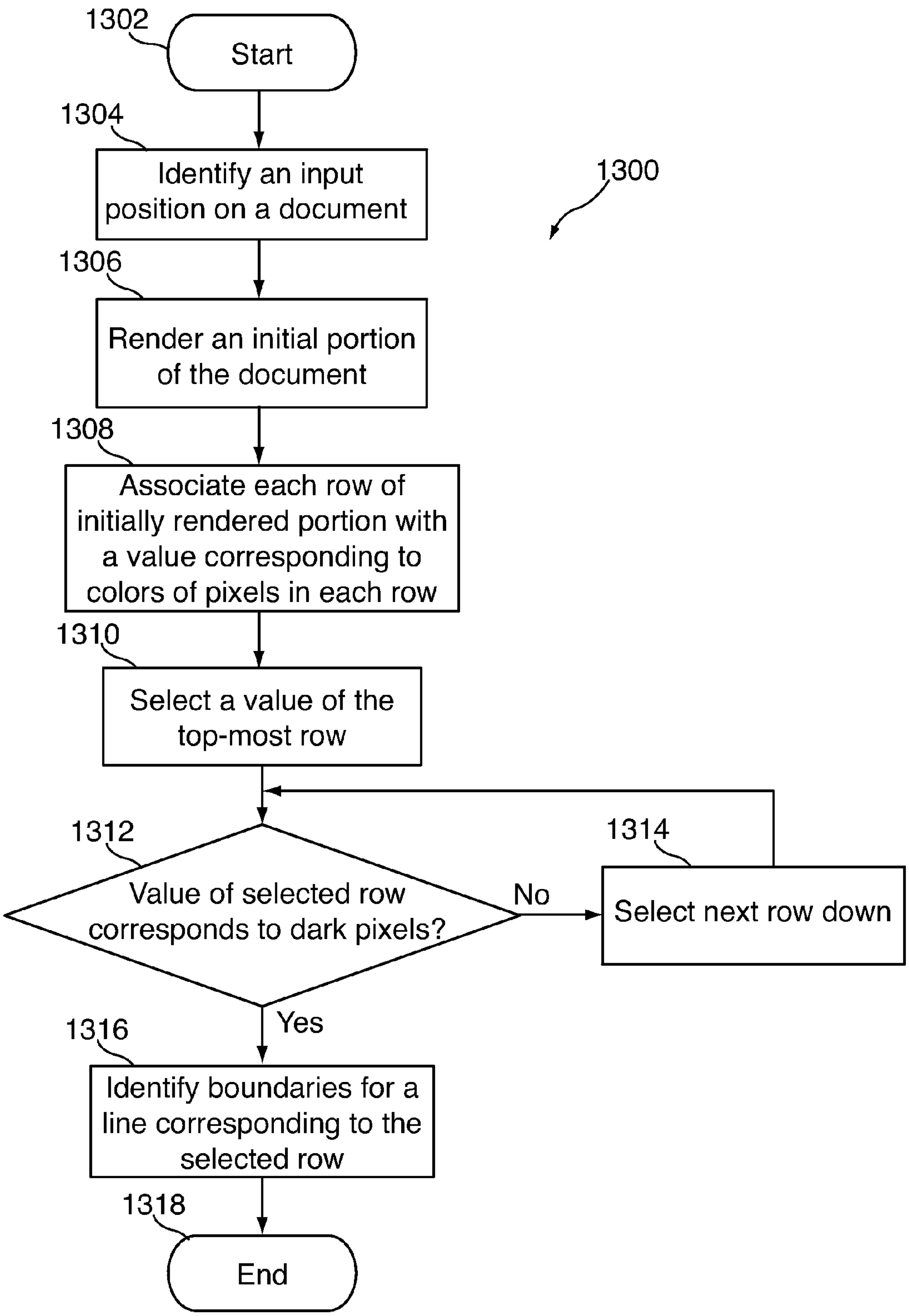
FIG. 13 is a flowchart of an illustrative process for identifying a line of a document on which to place a representation of a signature in accordance with some embodiments of the invention.

FIG. 13 is a flowchart of an illustrative process 1300 for identifying a line of a document on which to place a representation of a signature in accordance with some embodiments of the invention. Process 1300 can begin at step 1302. At step 1304, an input position provided on a document can be identified. For example, an electronic device can identify an input position corresponding to a cursor location or to a touch input location provided by a user. At step 1306, an initial portion of the document substantially centered about the input position can be rendered. For example, the electronic device can render an 8×8 pixel portion of the document centered about the identified input position. In some cases, the rendering can take place off-screen. At step 1308, each row of the initially rendered portion can be associated with one or more particular values. For example, the electronic device can take a sum of values of pixels in a row, and associate the sum with the corresponding row. In some cases, a threshold can be applied to the sum to replace sum values with one of two or more values based on the threshold (e.g., a binary threshold). At step 1310, a value of the top-most row can be selected, although a bottom row, middle row, or other row can also be selected first.

At step 1312, the electronic device can determine whether the selected value corresponds to dark pixels. For example, the electronic device can determine whether the selected value is larger than a threshold associated with dark pixels. If the electronic device determines that the selected value does not correspond to dark pixels, process 1300 can move to step 1314. At step 1314, the electronic device can select a value associated with a next row down in the initially rendered portion, and can return to step 1312. If, at step 1312, the electronic device instead determines that the selected value corresponds to dark pixels, process 1300 can move to step 1316. At step 1316, the electronic device can determine that the selected row corresponds to a top surface of a line, and can identify boundaries for the line corresponding to the selected row. For example, the electronic device can implement a process such as the one described below in FIG. 14. Process 1300 can then end at step 1318.

Figure 14:
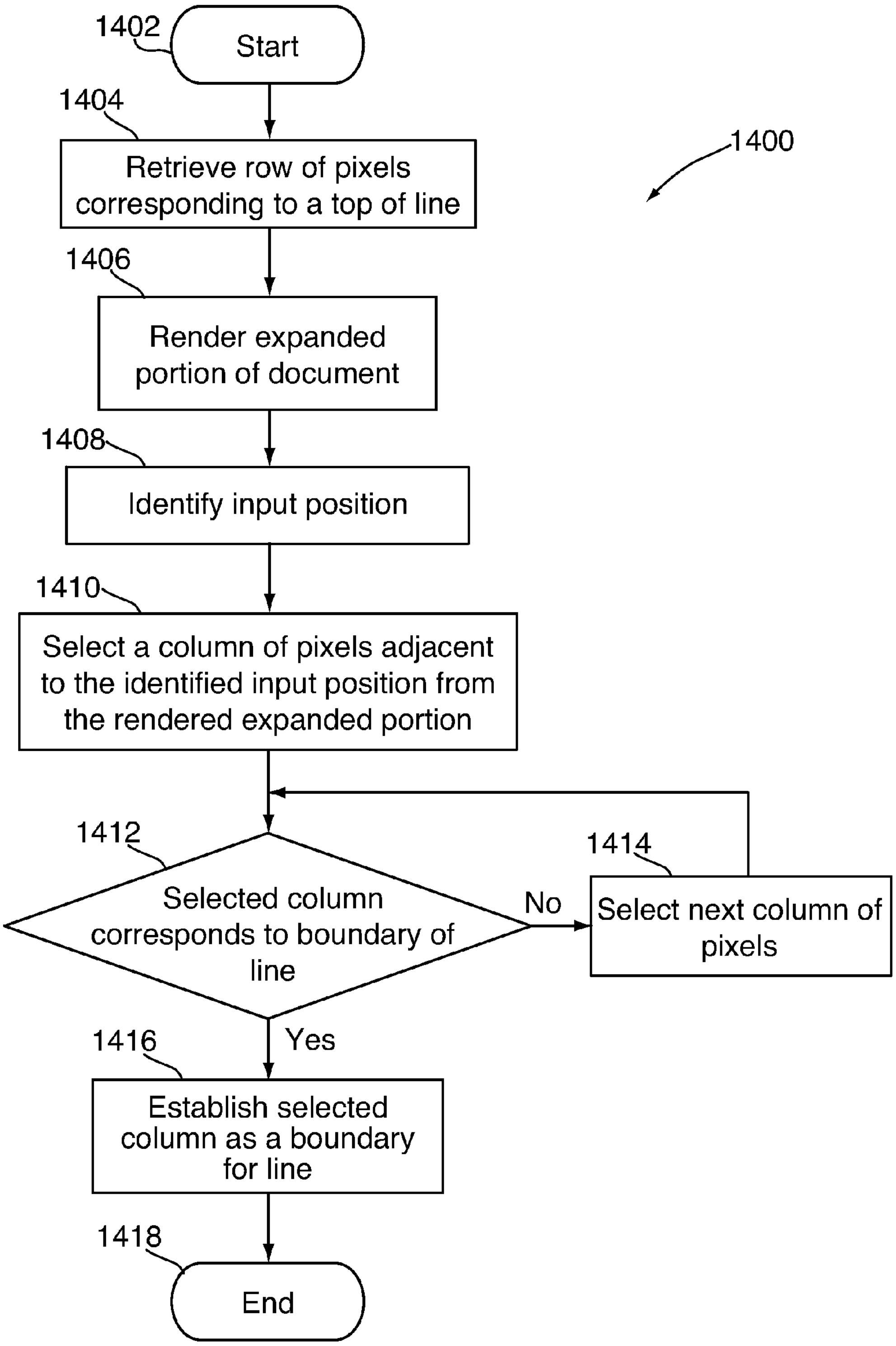
FIG. 14 is a flowchart of an illustrative process for identifying boundaries of an identified line of a document in accordance with some embodiments of the invention.

FIG. 14 is a flowchart of an illustrative process 1400 for identifying boundaries of an identified line in accordance with some embodiments of the invention. Process 1400 can begin at step 1402. At step 1404, a row of pixels corresponding to a top of an identified line can be retrieved, where the line may be part of a displayed document. For example, an electronic device, using process 1300, can identify at least a portion of a row of pixels corresponding to a top surface of a line. At step 1406, an expanded portion of the document can be rendered. For example, an electronic device can render (e.g., off screen), a region of the document that may include the identified row and one or more rows adjacent to the identified row, and that may extend across the entire width of the document or a certain portion of the width of the document. At step 1408, an input position can be identified. For example, an electronic device can identify a position of a cursor, or a position of a touch input. At step 1410, a column of pixels from the rendered expanded portion that may be adjacent to the identified input position can be selected. For example, the electronic device can select one or more columns of pixels that are immediately to the left or to the right of the identified input position.

At step 1412, the electronic device can determine whether the selected column corresponds to a boundary for the line. For example, the electronic device can determine whether pixels in each selected column include dark pixels corresponding to an element of a boundary, or whether pixels in each selected column include light pixels corresponding to a break in the line. If the electronic device determines that the selected column does not correspond to a boundary, process 1400 can move to step 1414 and select a next column of pixels adjacent to a previously selected column, but farther from the input position in one or both directions along the line (e.g., left, right or both). Process 1400 can then return to step 1412. If, at step 1412, the electronic device instead determines that the selected column corresponds to a boundary, process 1400 can move to step 1416. At step 1416, the selected column can be established as a boundary for the line. For example, the electronic device can identify a particular column that includes a pixel indicative of a boundary. Process 1400 can then end at step 1418.

Figure 15:
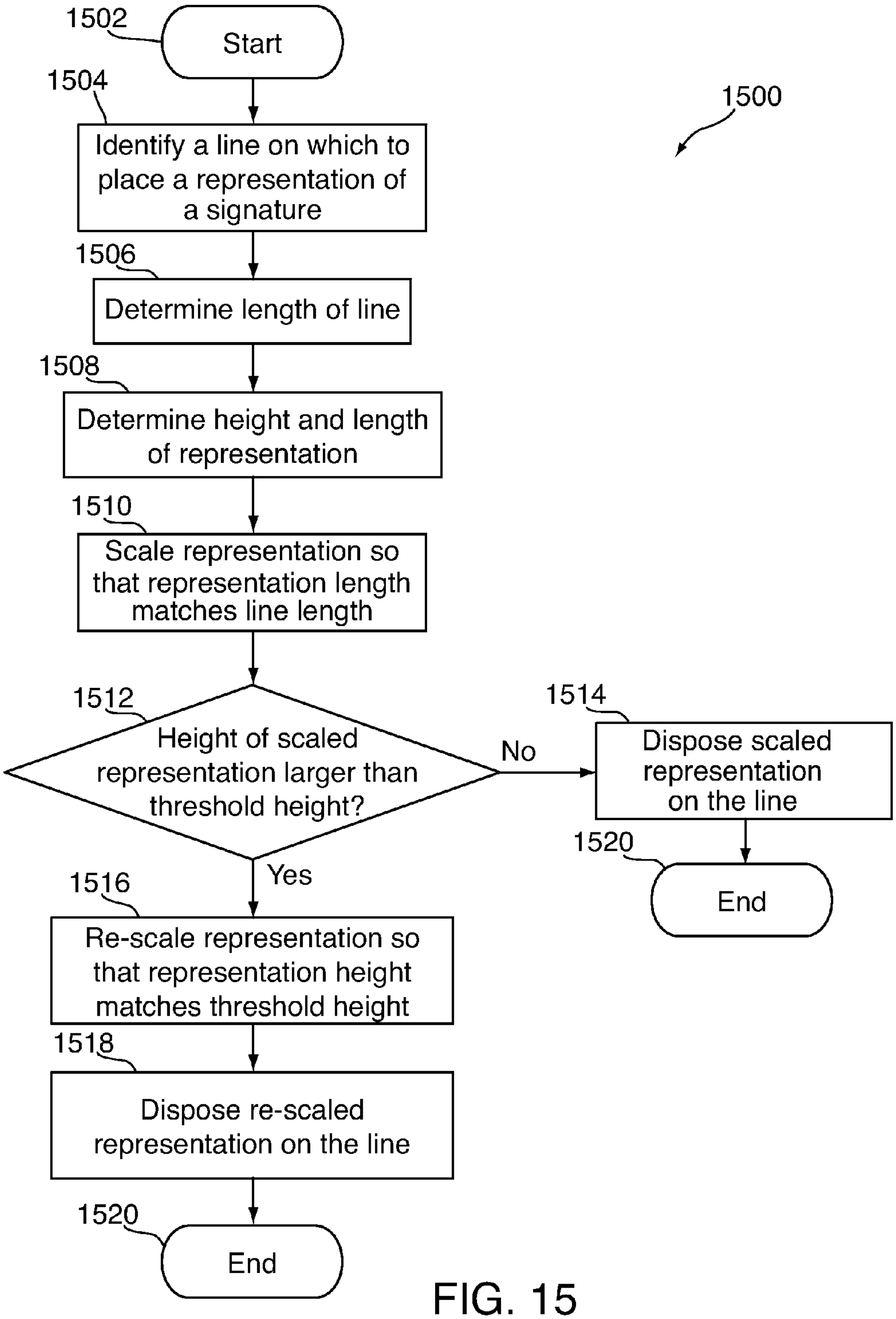
FIG. 15 is a flowchart of an illustrative process for positioning a signature in a document in accordance with some embodiments of the invention.

FIG. 15 is a flowchart of an illustrative process 1500 for positioning a representation of a signature in a document in accordance with some embodiments of the invention. Process 1500 can begin at step 1502. At step 1504, a line on which to place a representation of a signature can be identified. For example, an electronic device can identify a line using one or both of process 1300 of FIG. 13 and/or process 1400 of FIG. 14. At step 1506, a length of the line can be determined. For example, the electronic device can determine a distance between left and right boundaries of the line. At step 1508, a height and length of the representation can be determined. For example, the electronic device can determine an initial height and length for the representation based on an image captured and used to create the representation. In some cases, a default height or width can be used for the representation. At step 1510, the representation can be scaled so that the length of the representation matches the determined length of the line. In some cases, the scaling can maintain a constant aspect ratio for the representation.

At step 1512, the electronic device can determine whether the height of the scaled representation is larger than the threshold height. For example, the electronic device can determine whether the height of the scaled representation is less than 0.5 inches (e.g., to reduce the chance that a signature will extend beyond an upper boundary of a signature field). If the electronic device determines that the height of the scaled representation is less than the threshold height, process 1500 can move to step 1514. At step 1514, the scaled representation can be disposed on the line. For example, the electronic device can dispose the representation on the line such that it is offset from or aligned with a boundary of the line. Process 1500 can then move to step 1520 and end.

If, at step 1512, the electronic device instead determines that the height of the scaled representation is larger than the threshold height, process 1500 can move to step 1516. At step 1516, the representation can be re-scaled such that the height of the representation matches the threshold height. The length of the re-scaled representation can be selected such that the representation maintains its aspect ratio. At step 1518, the re-scaled representation can be disposed on the line. For example, the electronic device can dispose the representation on the line such that it is offset from or aligned with a boundary of the line. Process 1500 can then move to step 1520 and end.

Figure 16:
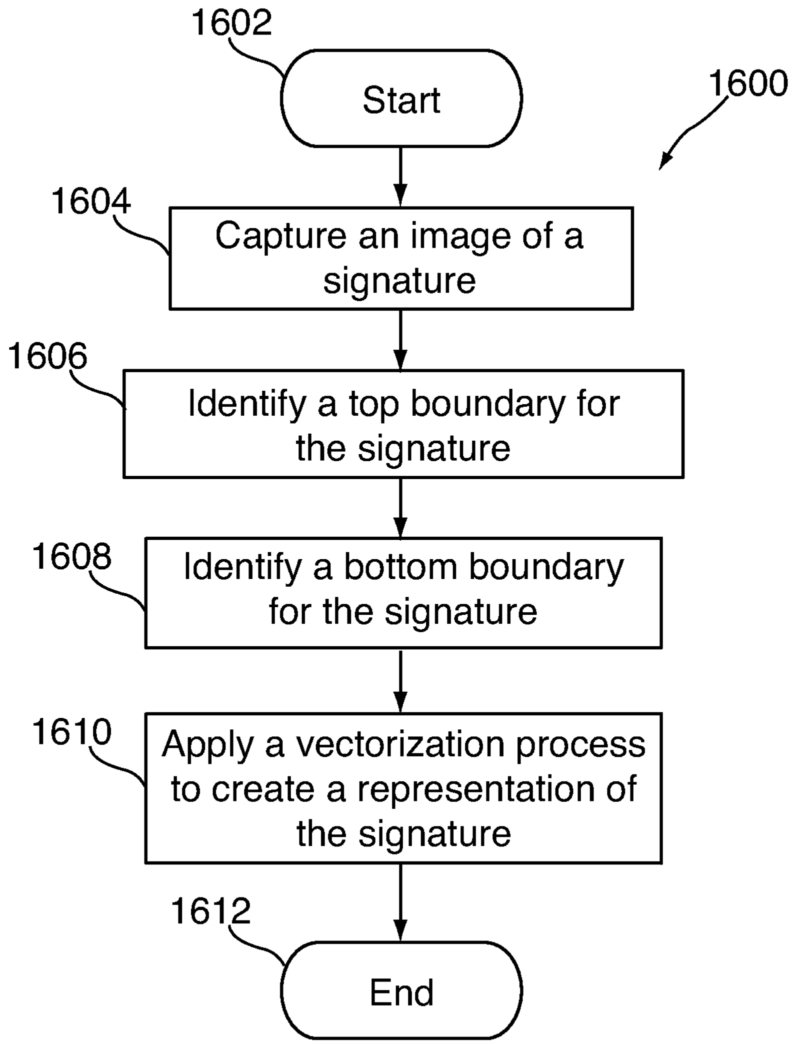
FIG. 16 is a flowchart of an illustrative process for creating a digital representation of a signature in accordance with some embodiments of the invention.

FIG. 16 is a flowchart of an illustrative process 1600 for creating a digital representation of a signature in accordance with some embodiments of the invention. Process 1600 can begin at step 1602. At step 1604, an image of a signature can be captured. For example, a signature that is substantially aligned with a reference line can be captured. At step 1606, a top boundary for the signature can be identified. In some cases, the top boundary can include a row having a particular amount of light portions (e.g., of white pixels). At step 1608, a bottom boundary for the signature can be identified. For example, the bottom boundary can include a row having a particular amount of light portions (e.g., white pixels). In some cases, the reference line can be positioned between the top boundary and the bottom boundary. At step 1610, a vectorization process can be applied to portions of the captured image that are between the top boundary and the bottom boundary to create a representation of the signature. Process 1600 can end at step 1612.

Figure 17:
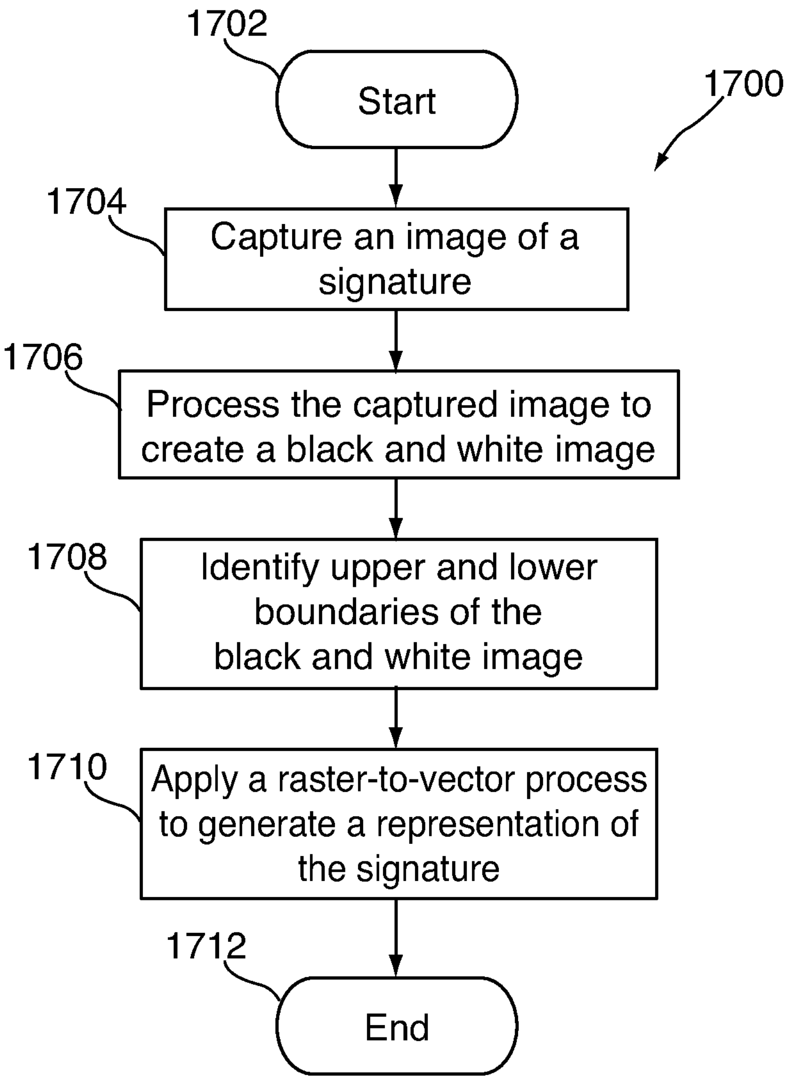
FIG. 17 is a flowchart of an illustrative process for digitizing a signature in accordance with some embodiments of the invention.

FIG. 17 is a flowchart of an illustrative process 1700 for digitizing a signature in accordance with some embodiments of the invention. Process 1700 can begin at step 1702. At step 1704, an image of a signature can be captured. The image can include a color image. At step 1706, the image can be processed to generate a black and white image corresponding to the captured color image. For example, a process for converting the color image to a grayscale image, and a color threshold process can be applied to the image. At step 1708, upper and lower boundaries of the black and white image for the signature can be identified. At step 1710, a raster-to-vector process can be applied to the portion of the black and white image between the upper and lower boundaries to generate a representation of the signature. Process 1700 can end at step 1712.

Figure 18:
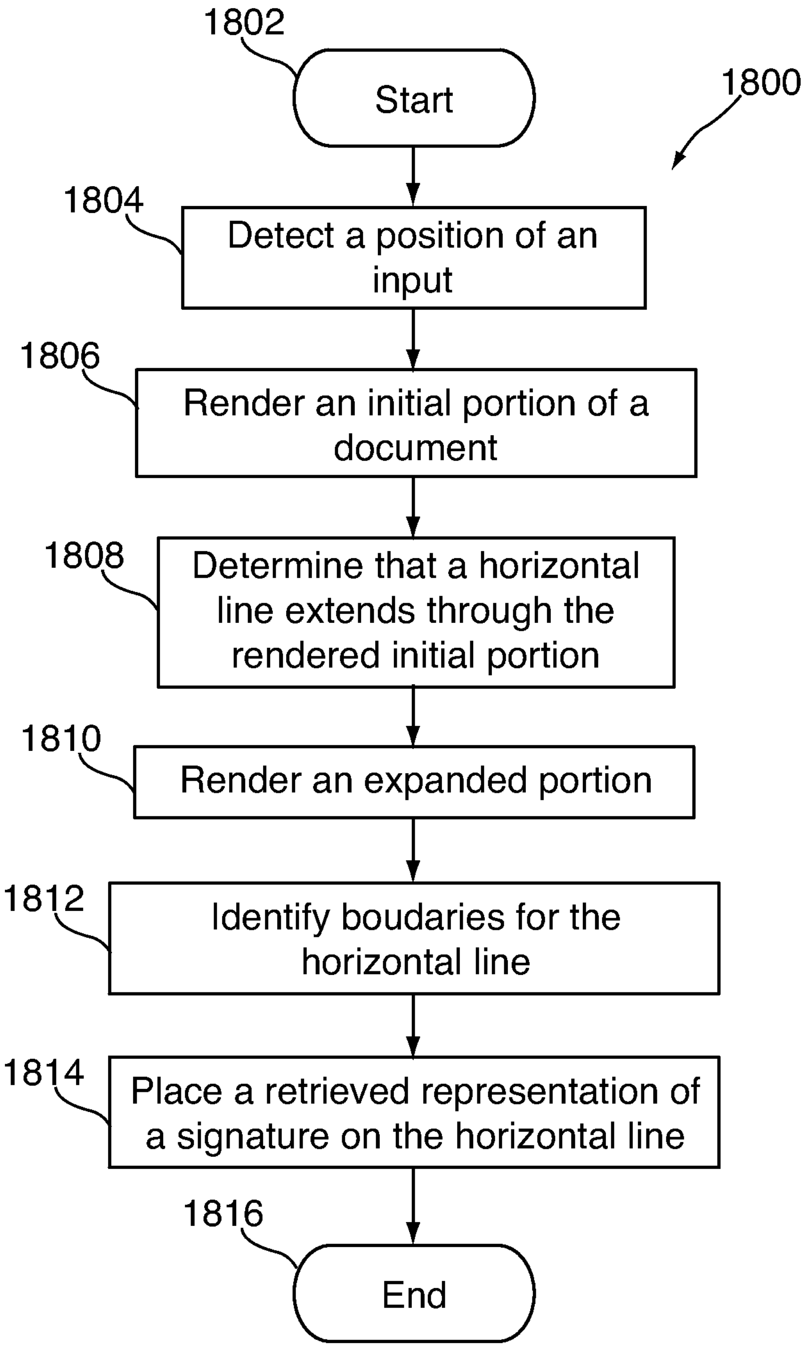
FIG. 18 is a flowchart of an illustrative process for placing a representation of a signature in a document in accordance with some embodiments of the invention.

FIG. 18 is a flowchart of an illustrative process 1800 for placing a representation of a signature on a document in accordance with some embodiments of the invention. Process 1800 can begin at step 1802. At step 1804, a position of an input along a displayed document can be detected. For example, a position of a cursor or a position of a touch input can be detected. At step 1806, an initial portion of the document can be rendered. For example, an electronic device can render an initial portion that is adjacent to the detected input position. At step 1808, the electronic device can determine that a horizontal line extends through the rendered initial portion. At step 1810, an expanded portion of the document can be rendered. For example, the electronic device can render a portion of the document that includes the determined horizontal line. At step 1812, at least one boundary for the horizontal line can be identified from the rendered expanded portion. For example, the electronic device can identify one or more breaks in the horizontal line, or other displayed content indicating a boundary for the horizontal line. At step 1814, a retrieved representation of a signature can be placed with respect to (e.g., on) the horizontal line adjacent at least one of the identified boundaries or between the identified boundaries. Process 1800 can end at step 1816.

Figure 19:
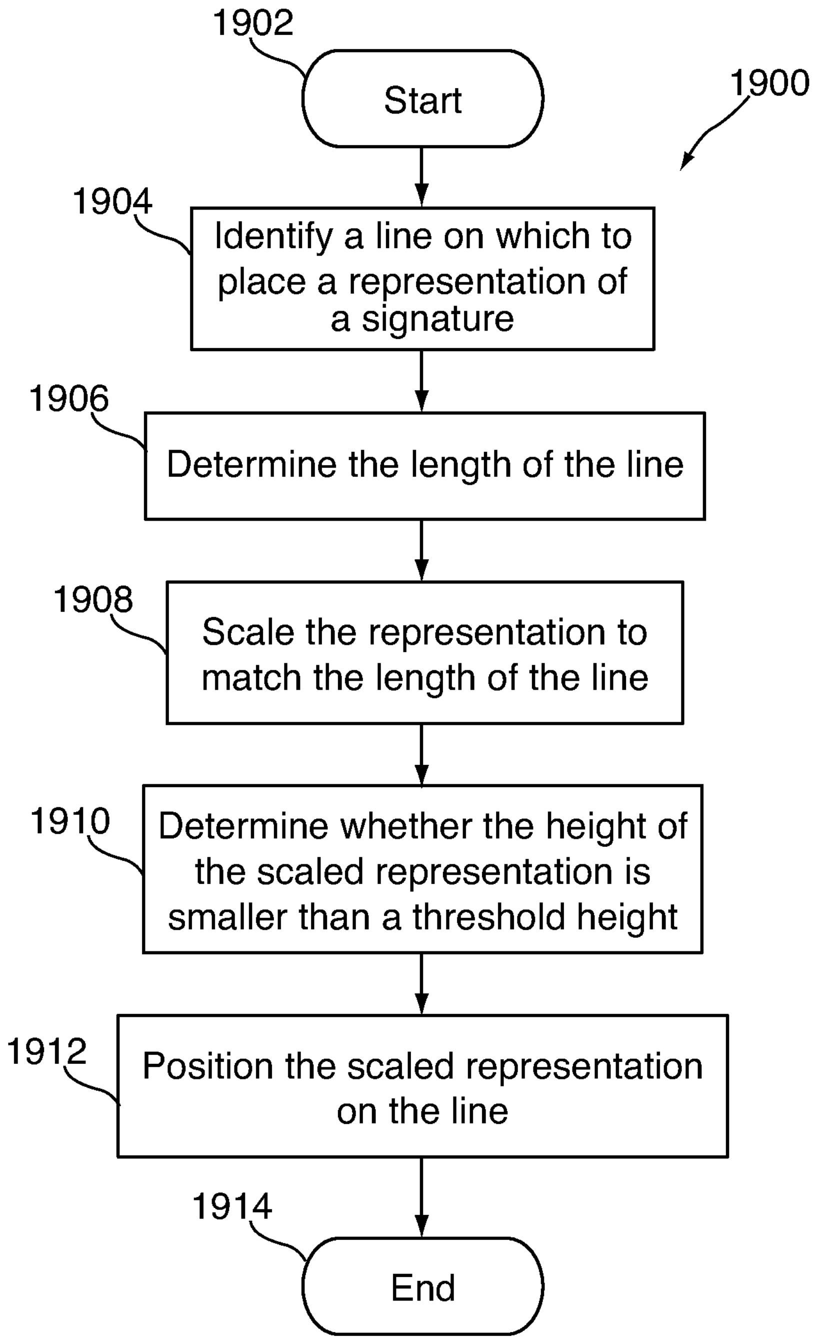
FIG. 19 is a flowchart of an illustrative process for positioning a representation of a signature on a line of a document in accordance with some embodiments of the invention.

FIG. 19 is a flowchart of an illustrative process 1900 for positioning a representation of a signature on a line of a document in accordance with some embodiments of the invention. Process 1900 can begin at step 1902. At step 1904, a line on which to place a representation of a signature can be identified. For example, an electronic device can identify a line from a position of an input provided by a user. At step 1906, a length of the line can be determined. For example, the electronic device can identify one or more boundaries for the line. At step 1908, the representation can be scaled to match the determined length of the line. For example, the electronic device can scale the representation while maintaining an aspect ratio of the representation. At step 1910, the electronic device can determine whether the height of the scaled representation is smaller than a threshold height. At step 1912, the scaled representation can be positioned on the line in response to determining that the height of the scaled representation is smaller than the threshold height. Process 1900 can end at step 1914.

Figure 20:
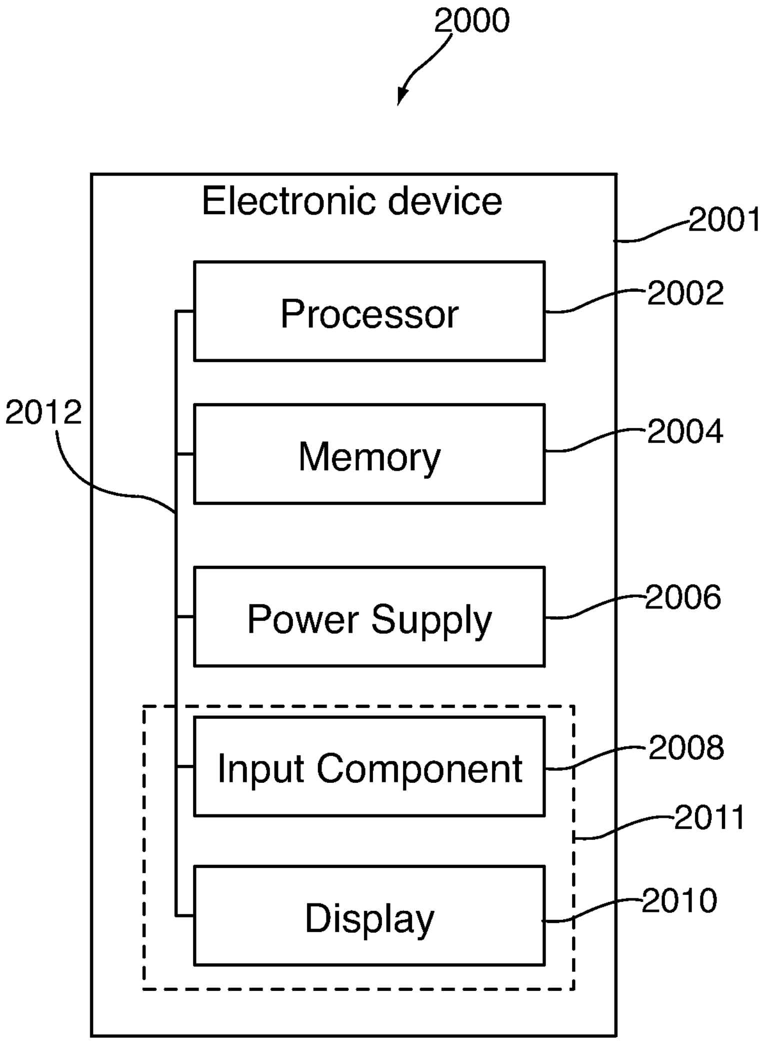
FIG. 20 is a schematic view of an illustrative electronic device for capturing a signature or for placing a representation of a signature in a document in accordance with some embodiments of the invention.

Any suitable electronic device can be used to capture a signature, or to provide a representation of a signature in a displayed document. FIG. 20 is a schematic view of an illustrative electronic device 2000 for capturing a signature or for placing a representation of a signature in a document in accordance with some embodiments of the invention. Electronic device 2000 may be any portable, mobile, or hand-held electronic device configured to capture a signature and/or present a document to a user wherever the user travels. Alternatively, electronic device 2000 may not be portable at all, but may instead be generally stationary. Electronic device 2000 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 2000 may perform a single function (e.g., a device dedicated to capturing signatures or presenting documents) and, in other embodiments, electronic device 2000 may perform multiple functions (e.g., a device that presents documents, plays music, and receives and transmits telephone calls).

Electronic device 2000 may include a processor 2002, memory 2004, power supply 2006, input component 2008, and display 2010. Electronic device 2000 may also include a bus 2012 that may provide one or more wired or wireless communication links or paths for transferring data and/or power to, from, or between various other components of device 2000. In some embodiments, one or more components of electronic device 2000 may be combined or omitted. Moreover, electronic device 2000 may include other components not combined or included in FIG. 20 and/or several instances of one or more of the components shown in FIG. 20.

Memory 2004 may include one or more storage mediums, including for example, a hard-drive, flash memory, non-volatile memory, permanent memory such as read-only memory ("ROM"), semi-permanent memory such as random access memory ("RAM"), any other suitable type of storage component, or any combination thereof. Memory 2004 may include cache memory, which may be one or more different types of memory used for temporarily storing data for electronic device application programs. Memory 2004 may store media data (e.g., music and image files), software (e.g., a boot loader program, one or more application programs of an operating system for implementing functions on device 2000, etc.), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 2000 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Power supply 2006 may provide power to one or more of the components of device 2000. In some embodiments, power supply 2006 can be coupled to a power grid (e.g., when device 2000 is not a portable device, such as a desktop computer). In some embodiments, power supply 2006 can include one or more batteries for providing power (e.g., when device 2000 is a portable device, such as a cellular telephone). As another example, power supply 2006 can be configured to generate power from a natural source (e.g., solar power using solar cells).

One or more input components 2008 may be provided to permit a user to interact or interface with device 2000. For example, input component 2008 can take a variety of forms, including, but not limited to, an electronic device pad, dial, click wheel, scroll wheel, touch screen, one or more buttons (e.g., a keyboard), mouse, joy stick, track ball, microphone, camera, proximity sensor, light detector, and combinations thereof. Each input component 2008 can be configured to provide one or more dedicated control functions for making selections or issuing commands associated with operating device 2000.

Electronic device 2000 may also include one or more output components that may present information (e.g., visual, audible, and/or tactile information) to a user of device 2000. An output component of electronic device 2000 may take various forms, including, but not limited to, audio speakers, headphones, audio line-outs, visual displays, antennas, infrared ports, rumblers, vibrators, or combinations thereof.

For example, electronic device 2000 may include display 2010 as an output component. Display 2010 may include any suitable type of display or interface for presenting visual content to a user. In some embodiments, display 2010 may include a display embedded in device 2000 or coupled to device 2000 (e.g., a removable display). Display 2010 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 2010 can include a movable display or a projecting system for providing a display of content on a surface remote from electronic device 2000, such as, for example, a video projector, a head-up display, or a three-dimensional (e.g., holographic) display. As another example, display 2010 may include a digital or mechanical viewfinder, such as a viewfinder of the type found in compact digital cameras, reflex cameras, or any other suitable still or video camera. In some embodiments, display 2010 may include display driver circuitry, circuitry for driving display drivers, or both. Display 2010 can be operative to present visual content provided by device 2000.

It should be noted that one or more input components and one or more output components may sometimes be referred to collectively herein as an input/output ("I/O") interface (e.g., input component 2008 and display 2010 as I/O interface 2011). It should also be noted that input component 2008 and display 2010 may sometimes be a single I/O component, such as a touch screen that may receive input information through a user's touch of a display screen and that may also provide visual information to a user via that same display screen.

Electronic device 2000 may also be provided with an enclosure or housing 2001 that may at least partially enclose one or more of the components of device 2000 for protecting them from debris and other degrading forces external to device 2000. In some embodiments, one or more of the components may be provided within its own housing (e.g., input component 2008 may be an independent keyboard or mouse within its own housing that may wirelessly or through a wire communicate with processor 2002, which may be provided within its own housing).

Processor 2002 of device 2000 may include any processing or control circuitry operative to control the operations and performance of one or more components of electronic device 2000. For example, processor 2002 may be used to run operating system applications, firmware applications, media playback applications, media editing applications, or any other application. In some embodiments, processor 2002 may receive input signals from input component 2008 and/or drive output signals through display 2010.

It is to be understood that the steps shown in each one of processes 500 and 1300-1900 of FIGS. 5 and 13-19, respectively, are merely illustrative and that existing steps may be modified or omitted, additional steps may be added, and the order of certain steps may be altered.

Moreover, the processes described with respect to FIGS. 5 and 13-19, as well as any other aspects of the invention, may each be implemented in hardware or a combination of hardware, software, and/or firmware. Embodiments of the invention can also be embodied as computer-readable code on a computer-readable medium. The computer-readable medium may be any data storage device that can store data which can thereafter be read by a computer system. Examples of the computer-readable medium include read-only memory ("ROM"), random-access memory ("RAM"), CD-ROMs, DVDs, magnetic tape, and optical data storage devices. The computer-readable medium can also be distributed over network-coupled computer systems so that the computer-readable code may be stored and executed in a distributed fashion.

Although many of the embodiments of the present invention are described herein with respect to personal computing devices, it should be understood that the present invention is not limited to personal computing applications, but is also generally applicable to other applications.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for creating a digital representation of a signature, the method comprising:

capturing an image of a signature, wherein the signature is aligned with a reference line associated with the image;

identifying a central row of pixels in the captured image corresponding to the reference line;

identifying a closest row of pixels above the central row of pixels that comprises a consecutive sequence of white pixels of at least a threshold length, and for which a threshold number of additional rows comprise a consecutive sequence of white pixels;

identifying a top boundary within the image for the signature, wherein the top boundary comprises a row having a particular amount of light portions, wherein the top boundary comprises the identified closest row of pixels;

identifying a bottom boundary within the image for the signature, wherein the bottom boundary comprises a row having a particular amount of light portions, and wherein the reference line is positioned between the top boundary and bottom boundary; and applying a vectorization process to portions of the captured image that are between the top boundary and the bottom boundary to create a representation of the image.

2. The method of claim 1, comprising:

directing a user to position the signature provided on an object opposite a camera such that the signature is aligned with the reference line that is provided by a display window.

3. The method of claim 2, comprising:

displaying a preview of the image of the signature in a display window, wherein the display window comprises the reference line.

4. The method of claim 3, comprising:

directing the user to move the object relative to the camera so that the signature is aligned with the reference line in the display window.

5. The method of claim 1, comprising:

converting individual pixels of the captured image to black and white pixels using a thresholding function.

6. The method of claim 1, wherein:

the consecutive sequence of white pixels comprises at least thirty white pixels.

7. An electronic device, comprising:

a camera operative to capture an image of a signature provided on a substrate;

display circuitry operative to provide a portion of the captured image in a display window; and control circuitry configured to:

process the captured image to create a black and white image of the signature;

identify a position of a reference line provided on the display window relative to the captured image;

identify a reference row of pixels corresponding to the captured reference line;

successively select each row of pixels above the identified reference row of pixels;

identify a first row of the successively selected rows of pixels that comprises a sequence of pixels as an upper boundary for the signature above the reference line;

identify a lower boundary for the signature below the reference line; and generate a vector representation of the black portions of the image between the upper boundary and the lower boundary, wherein the vector representation corresponds to the signature.

8. The electronic device of claim 7, wherein the control circuitry is configured to:

convert a captured color image to a grayscale image; and apply an adaptive thresholding function to the grayscale image to create the black and white image of the signature.

9. The electronic device of claim 7, wherein the sequence of pixels comprises a consecutive series of white pixels.

10. The electronic device of claim 7, wherein the control circuitry is operative to:

generate the vector representation of the signature based on the portion of the image provided in the display window.

11. The electronic device of claim 7, wherein:

the vector representation reproduces changes in line thickness and velocity of at least one stroke of the signature.

12. A method for digitizing a signature, the method comprising:

capturing a color image of a signature while the signature is positioned relative to the displayed reference line;

processing the captured image to generate a black and white image corresponding to the captured image;

identifying a reference line for aligning the signature;

identifying a central row of pixels in the captured image corresponding to the reference line;

identifying a top boundary as a closest row of pixels above the central row of pixels that comprises a consecutive sequence of white pixels of at least a threshold length, and for which a threshold number of additional rows comprise a consecutive sequence of white pixels; and applying a raster-to-vector process to the portion of the black and white image in regions adjacent to the reference line to generate a representation of the signature.

13. The method of claim 12, comprising:

identifying a lower boundary below the central row.

14. The method of claim 12, comprising:

encrypting the representation to block unauthorized use of the representation.

15. The method of claim 14, comprising:

associating the encrypted representation with a user.

16. The method of claim 12, wherein:

associating the representation with an application, wherein only the application can make use of the representation.

17. A non-transitory, computer-readable medium comprising computer program logic recorded thereon wherein the computer program logic is configured to:

capture an image of a signature, wherein the signature is aligned with a reference line associated with the image;

identify a central row of pixels in the captured image corresponding to the reference line;

identify a top boundary for the signature above the central row of pixels, wherein the top boundary comprises a first row of the image having a first consecutive amount of light portions;

identify a bottom boundary for the signature below the central row of pixels, wherein the bottom boundary comprises a second row of the image having a second consecutive amount of light portions, and wherein the reference line is positioned between the top boundary and the bottom boundary, wherein the first and second amounts of light portions are greater than a light portion threshold; and apply a vectorization process to portions of the captured image that are between the top boundary and the bottom boundary to create a representation of the signature.

* * * * *